United States Patent Office 3,543,491
Patented Dec. 1, 1970

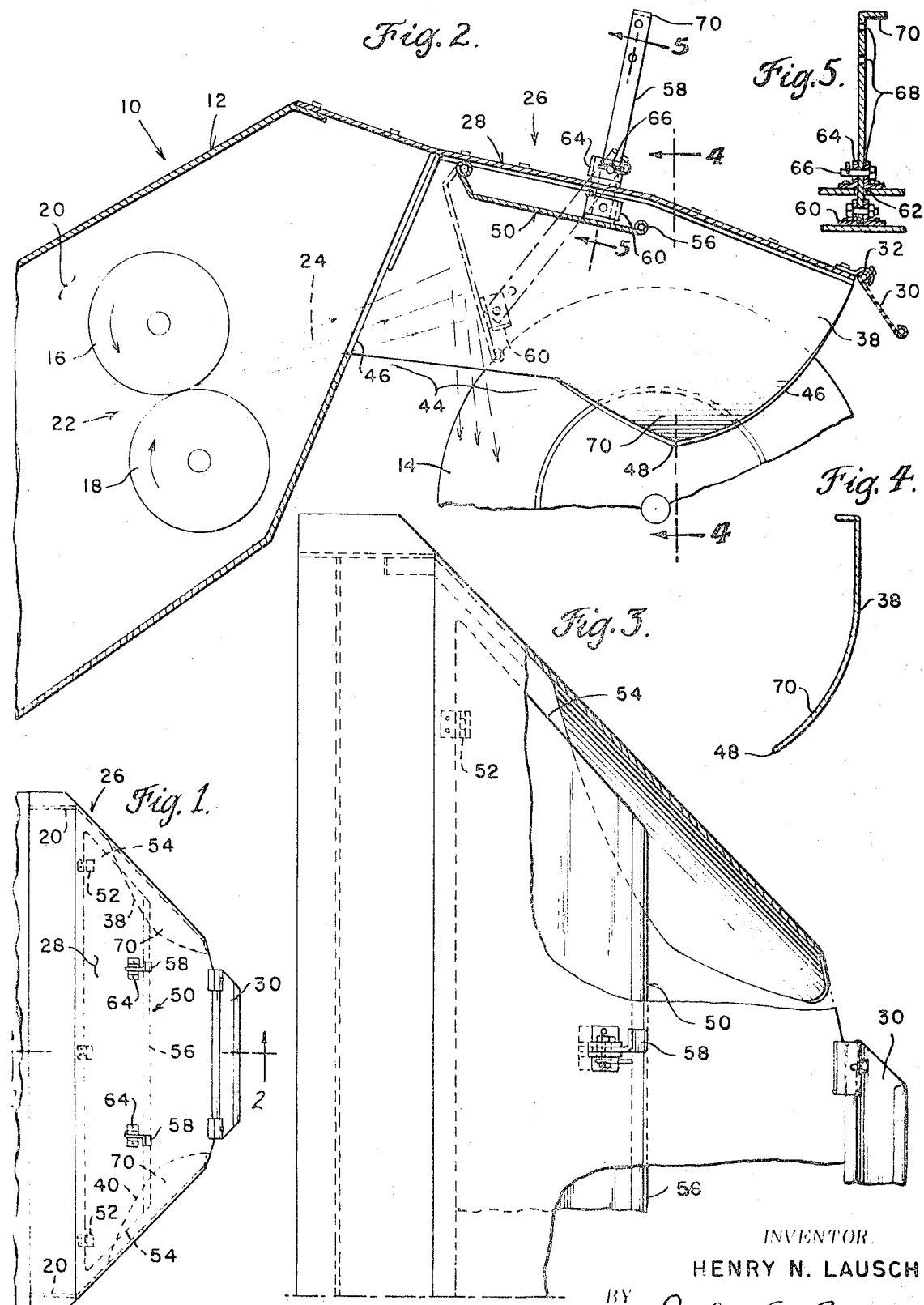

3,543,491
WINDROW BAFFLE FOR CROP HARVESTING MACHINES
Henry N. Lausch, Leola, Pa., assignor to Sperry Rand Corporation, New Holland, Pa., a corporation of Delaware
Filed June 3, 1968, Ser. No. 734,098
Int. Cl. A01d 43/00
U.S. Cl. 56—192   11 Claims

ABSTRACT OF THE DISCLOSURE

A harvesting machine has a crop deflector for receiving cut crops from a mower-conditioner and forming the cut crops into either a windrow or a swath. The crop deflector comprises an upper panel extending across the width of the machine, two rearwardly converging side panels, a front baffle and a rearward transverse panel cross the end of the top panel. The forward portion of the side panels having recesses to pass cut crops deflected by the baffle to form a swath. The baffle forms a swath in the lower position by deflecting cut crops downwardly between the recessed forward portions of the side panels and passing cut crops in the raised position for forming into a windrow by the converging side panels and the transverse panel.

BACKGROUND OF THE INVENTION

This invention relates to harvesting and crop treating machines, and more particularly to the more recently developed mower-conditioner-windrowing machine which, as its name implies, is adapted to substantially simultaneously mow, condition and windrow the crop. Normally, the crop material is discharged rearwardly after said conditioning and thence acted upon by multi-adjustable baffle means in some machines, to help form it into a windrow or swath, as desired. Machines of this type customarily employ cooperative opposed crop treating roll members between which mown hay or other crop material is directed. As the crop material leaves the conditioning members, it is usually directed rearwardly with considerable force wtih a tendency for the material to move parallel to the ground and gradually settle thereon in a compressed mat form. This is undesirable because, while the passing of the material between the crop treating roll members serves to condition the crop material with the intent to accelerate drying, a depositing of the material in a matlike formation close to the ground prevents air from readily circulating therethrough to finish the field drying procedure.

While I am aware of prior art devices embodying guides or deflectors to confine the stream of discharged crop material into various forms of windrows, many such deflectors or baffles have been of the fixed type or those of the adjustable or semi-adjustable type have been constructed in a manner for which the adjustment thereof is not readily accessible, or necessitates an undue amount of mechanical work. With respect to some stationary baffle types in which the stationary guides thereof have a fixed relation to the hay conditioning roll, there is a disadvantage of the housing and deflector being angled in an undesirable manner when the header is swung upwardly or adjusted to various intermediate positions, such that an ineffective windrow or no windrow at all is produced, or that the ejected windrowed material is deformed thereby, or that the ejected crop material lodges in the various drives and transmission components and presents a nuisance factor.

Other machines of this general character require adjustable side wing panels in cooperation with a top panel, wherein the wing panels have to be manually spread apart in the laterial direction to permit a full width swath of material to be deposited, or laterally narrowed to affect a narrow windrow of crop material.

Other known machines embodying deflector baffles utilize an intermediate adjustable top baffle which has been suspended beneath the main machinery housing or baffle means and works in cooperation with adjustable wing panels in a manner which requires shutting down of the machinery and climbing on and/or reaching beneath the machine to affect adjustment thereof.

SUMMARY OF THE INVENTION

The present invention therefore is directed to an improved adjustable baffle means for use on a variety of harvesting or related machines including those of conditioners alone and those of the mower-conditioner-windrower type, with construction of the baffle means and the adjustment means thereof being such that ready adjustment is facilitated by hand without tools and without the need to shut down the machinery. In crop treating implements such as the mower-conditioner-windrower, the length of the rollers that engage and condition the crop are substantially the same length as the mower cutter means, and therefore the conditioned crop material has a tendency to fan out laterally on the ground in a shallow layer or swath unless confined and/or otherwise deflected as by windrow baffles and deflectors.

It is a primary object of this invention to provide improved baffle means for guiding crop material as it comes from the crop treating members, said baffle means being utilized selectively to deflect the crop material toward the ground in the manner that deposits the material either in a loose or fluffy full width swath or in a fluffy windrow manner to facilitate drying thereof.

Another object of this invention is to provide crop engaging baffle means part of which is adjustable in character to permit a variety of deflection angles depending upon the prevailing harvesting conditions and crop material.

Still another object of the invention is to provide improved crop engaging baffle and attendant adjustment means to form a windrow or swath having improved curing characteristics, and which baffle and adjustment means are relatively inexpensive to manufacture and assemble, and to be hand adjusted with a minimum of effort without shutting down the machinery.

Still another object of the invention is to provide improved baffle means embodying fixed laterally spaced wing panels of predetermined configuration and an adjustable intermediate top panel section disposed for selective cooperation with the wing panels, in such a manner that, depending upon the pre-selected position of only the latter baffle, the machine will deposit the crop in a windrow or in a substantially full width swath.

These and other objects of this invention will become more apparent hereinafter from reading the specification and from the recital of the appended claims, all considered with respect to the illustrative drawing figures.

DESCRIPTION OF THE DRAWINGS

FIG. 1 is a top plan of the improved baffle structure of the present invention shown on a small scale;

FIG. 2 is a fragmentary enlarged cross-section view taken on line 2—2 of FIG. 1 and showing the adjustable relationship of the baffle and related components;

FIG. 3 is an enlarged plan view of one half of the baffle shown in FIG. 1, with certain portions of the top panel broken away to better illustrate hidden components;

FIG. 4 is a cross-sectional view taken substantially on the line 4—4 of FIG. 2; and FIG. 5 is a cross-sectional view through an adjustment means, taken substantially on line 5—5 of FIG. 2.

DESCRIPTION OF THE PREFERRED EMBODIMENT

Referring now to the drawings wherein like reference numerals designate corresponding parts throughout the several figures, 10 denotes generally a harvesting machine to which the windrow forming baffles are attached, said machine being shown only fragmentarily inasmuch as the invention is directed more particularly to the crop discharging and windrow forming end of said machine. Reference is hereby made to assignee's U.S. Pat. No. 3,375,643 issued Apr. 2, 1968, which describes in detail and fully shows the general organization of a mower-conditoner harvesting machine which is exemplary of one kind with which the instant baffle structure may be used.

Suffice it to say that the windrower machine 10 comprises a frame or support structure 12 which is suitably carried on ground engaging wheels 14, and includes rotary hay or crop conditioning means in the form of rolls designated 16 and 18, respectively. The rolls are rotatably journalled in suitable laterally spaced, side support structures 20, and have suitable drive means, not shown, for driving the rolls in opposite directions, as shown by the arrows in FIG. 1. The upper roll 16 is preferably disposed slightly forward of lower crushing roll 18 and provides a forwardly and downwardly open bight area 22 into which the cut hay is directed and drawn therethrough by the aggressive action of conditioning rolls 16 and 18, said crop material being then discharged rearwardly in a trajectory as indicated by the arrows 24 against top and side members, or selectively against a lowered intermediate baffle means of the windrow forming structure, now to be described.

The windrow mechanism generally designated 26 comprises a composite top panel including main portion 28 disposed generally horizontally across the width of the machine and either a fixed or an adjustable rear panel 30 hingedly attached to 28 by any suitable means such as transverse hinged areas 32.

Attached to the top panel 28, which in top plan view is generally trapezoidal in shape and converges in a rearwardly direction, are a pair of downwardly depending, laterally spaced side wing panels 38 and 40. The conditioning rolls substantially span the distance between the sides 20, 20 thereby conditioning the cut material in a swath of substantially unchanged width as it passes from the mowing means and ramp plate, not shown, and into said conditioning rolls. The baffle means are attached to the frame and housing rearwardly adjacent the conditioning rolls, such that the side panels 38 and 40 which primarily form the windrow, are suitably attached to the upper panel 28 in a rearwardly converging manner (FIGS. 1 and 3). As the conditioned crop material is projected rearwardly, it is normally formed itno a windrow by the cooperative action of said side panels 38 and 40 together with the top panel 28 and rearward most panel 30. The side panels or wing members 38, 40 are of identical but opposite construction and are provided adjacent their lower longitudinal edge, commencing at a medial area thereof, with a pronounced recessed formation designated generally by the numeral 44. This recessed edge extends forwardly to the forward terminal edge 46 adjacent the side wall 20, and rearwardly tapers to intersect with the rearward arcuate terminal edge 46 at a point designated 48.

A trapezoidal shaped upper deflector baffle 50 is pivotally secured by laterally spaced hinger 52 to a forward portion of the underside of the top support panel 28, as shown, for swinging movement in a vertical plane. Panel 50 has side edges 54 which converge in a rearwardly direction, said panel terminated in a transversely extended reinforced edge 56. The panel 50 has one or more adjusting levers or bars 58 pivotally attached by bracket means 60 to a rearward portion thereof adjacent reinforced edge 56. Each adjusting bar 58 projects through a complemental slot 60 provided in top panel 28 and is adjustably secured to apertured bracket means 64 which is disposed adjacent said slot 62. The bar 58 is locked in position by a pin 66 removably inserted through the apertured bracket and a pre-selected aperture 68 and retained therein by means of a conventional hair pin type cotter pin. The adjusting bar 58 terminates at its upper end in a laterally folded lifting tab 70, which serves the purpose of facilitating adjustment thereof while simultaneously precluding loss of the adjusting bracket down through the slot 62.

Briefly reviewing the operation, after the swath of crop material has been cut by the mechanism it is swept upwardly and rearwardly into the conditioning rolls 16 and 18 whence it is projected rearwardly into the windrow forming means described aforesaid. If it is desired to have the material deposited in a full width swath, rather than in windrow formation. the baffle 50 is lowered and temporarily locked in a down position indexed by either of the uppermost apertures 68 on the bracket 58, whereby the crop material impinges against the baffle, as shown in the dash-dot position, where it is deflected rather sharply downward to the ground. The material is deflected downwardly substantially throughout the length of the rolls with the lateral edge of the crop material passing through or registering with the pronounced recessed areas of said side wing panels and being deposited upon the ground in a substantially full width swath, before it can be laterally restricted or funneled by the side panels 38 and 40 into a consolidated windrow.

When it is desired to have the crop material discharged again in a windrow formation, it is only necessary to raise the baffle 50 by removing the snap cotter pin 66 and reinserting the same when the baffle is in its full line raised position, being disposed closely and generally parallel adjacent the top panel 28. With the panel retracted in this fully up position, it is apparent that the conditioned crop material will be projected sharply rearwardly and generally upwardly whereby the trajectory thereof will carry the material into engagement with the laterally converging side panels 38 and 40, as well as with the top composite panel 28, 30. The concave lowermost longitudinal portions 70 of the side panels serve to partially support and funnel the material as it commences to drop by gravity, thereby further aiding the depositing thereof in the windrow formation with the stems of the material falling gently in a generally perpendicular manner upon the ground like jackstraws. The stems of the material are thus directed so that the crop material preferably lands on the end of the stems and gently tumbles on contact with the ground producing a loosely fluffed windrow.

It is apparent that the improved adjustable baffle means of this invention is relatively inexpensive to manufacture, and the simple operation thereof enables it to be readily adjusted completed exteriorly of the machine with a minimum of effort and time and without tools.

It is further apparent that the side wings 38 and 40 are of strategic design and configuration embodying lower longitudinal recessed edges in a manner which enables said wing panels to be rigidly mounted to the harvesting machine together with the main top panel. The embodiment therewith of the adjustable intermediate baffle 50 permits the crop material to be selectively deposited in either the full width swath or the consolidated windrow formation responsive only to adjustment of said upper intermediate panel 50.

While this invention has been described in conjunction with a particular embodiment thereof, it will be understood that it is capable of modification, and this application is intended to cover any variations, uses, or adaptations following, in general, the principles of the invention and including such departures from the present disclosure as come within known or customary practice in the art to

Having thus described my invention, what I claim is:
1. In a harvesting machnie, the combination including:
   (a) a mobile frame adapted to travel in a forward direction through field of forage or grain crop material, and including a housing and having widely spaced apart, generally vertically disposed side supports;
   (b) crop treating means including cooperative crop-conditioning rotary members journalled on and disposed between said side supports in a generally transverse horizontal manner to traject conditioned crop material rearwardly thereof;
   (c) crop deflector means carried by said frame and encompassing a major portion of the laterally spaced side areas and at least a portion of the top area behind and above respectively of the rotary members;
that improvement wherein the crop deflector means comprises in combination:
   (d) a pair of laterally spaced deflector wing baffles attached to the frame and disposed in a rearwardly converging but spaced apart fixed manner and having forward extremities adjoining the respective side supports of a main frame;
   (e) each of said deflector wings being disposed with the plane thereof in a generally vertical manner and being recessed along the longitudinally lower edge from a generally medial area to the forward extremity thereof where it adjoins the main frame side supports;
   (f) an upper, transversely extended, planar deflector baffle adjustable between a raised generally horizontal windrow inducing position and a lowered generally vertical swath producing position;
   (g) means supporting said upper baffle on said frame housing on the discharge side, above and behind the conditioning rotary members;
   (h) said upper baffle being disposed relative to said deflector wing baffles and the crop conditioning rotary members such that when said upper baffle is in a lowered condition it intercepts and deflects the trajected crop material downwardly in register with the recessed areas of the lower longitudinal edges of the wing baffles to deposit the material on the ground in a substantially full width swath, before the crop material can engage a substantial area of said deflector wings to become consolidated into a window.

2. A harvesting machine as defined in claim 1, wherein:
   (a) the means supporting said upper baffle include transversely disposed support means rigidly interconnecting the upper edges of the side wing baffles;
   (b) said upper baffle being hingedly supported to and beneath a part of said support means; and
   (c) co-acting means on said support means for selectively and releasably adjusting and locking said pivotal baffle in a predetermined raised or lowered condition.

3. A wide track harvesting machine as defined in claim 1, wherein:
   (a) the means supporting said upper baffle comprises a generally horizontally disposed plate member attached to said frame and projecting back over the converging side baffles;
   (b) said upper baffle being generally trapezoidal shape in top plan view and pivotally mounted beneath said plate member intermediate the length of said wing baffles;
   (c) cooperative adjustment means on said upper baffle and on said support plate member to selectively adjust the position of said baffle, said adjustment means being readily accessible exteriorly of the machine and operable without shutting down the machine;
   (d) means for driving said rotary members at a predetermined speed whereby the conditioned crop material is normally trajected sufficiently to generally fully engage the uppermost inner lateral sides of the deflector wings and the underside of said upper deflector baffle thereof when the latter is in a fully raised position thereby discharging the crop material in a fluffy windrow condition; and
   (e) the cooperative adjustment means include cooperative lever and pin means for selectively adjusting the upper baffle to a predetermined lowered position, in which position the upper baffle cooperates with minor portions of the side wings to selectively deflect the crop material from its normal trajectory and at a relatively sharp angle downwardly with the stems falling generally in a perpendicular manner to the ground like jackstraws in a loosely fluffed, relatively wide swath formation of substantially the same width as the wide track of the machine.

4. A harvesting machine as defined in claim 1, wherein:
   (a) said wing panels are each of greater vertical depth and of generally concave cross section extending generally from the aforesaid medial area toward the rearward extremity thereof; and
   (b) including means for driving the rotary crop-conditioning members.

5. A harvesting machine as defined in claim 1, wherein portions of the side panels are of inwardly concave formation and the rearwardmost areas of said side panels arcuately extend toward one another define a generally funneling area through which the crop material is directed and semi-supported during its discharge trajectory.

6. A harvesting machine as defined in claim 1, wherein the support means for the upper baffle interconnect with the side baffles all of which are rigidly fixed relative to each other at all times, and only the upper baffle is selectively shiftable relative thereto to determine the character of the formation of the discharging crop material.

7. A harvesting machine as defined in claim 2, wherein the means for selectively adjusting and locking the upper deflecting baffle comprises:
   (a) rigid lifting lever means having predetemined lock-engaging spaces and being flexibly attached to said baffle;
   (b) said lifting means projecting outwardly through an aperture in the support means for the upper baffle; and
   (c) locking means selectively and releasably engageable with said predetermined lock-engaging spaces to releasably lock said baffle in a predetermined position.

8. A harvesting machine as defined in claim 2, wherein the means for selectively adjusting and locking the upper deflecting baffle comprises:
   (a) at least one lifting lever pivotally attached to said baffle and projecting upwardly through a complemental aperture in the support means of the upper baffle; and
   (b) releasably locking means interengageable with said lifting lever to lock said baffle in a predetermined position relative to the upper baffle.

9. A harvesting machine as defined in claim 2, wherein the means for selectively adjusting, and locking the upper baffle comprises:
   (a) a pair of laterally spaced lifting levers pivotally connected to the baffle and projecting upwardly through complementally formed apertures in the transverse support means of the upper baffle; and
   (b) means on and above said support means including releasable locking means interengageable with said lifting levers to lock said upper baffle in a predetermined position.

10. A harvesting machine as defined in claim 8, wherein
   (a) the lifting lever is apertured in a plurality of predetermined places along its length; and
   (b) the releasable locking means comprises a fixed clamping bracket provided on the top panel and having an aperture with which a selected aperture in the lifting lever is aligned; and (c) lock pin means releasably interfitted with said pre-aligned apertures to selectively lock the intermediate baffle in a predetermined position, all of said means for effecting adjustment of said upper baffle being readily disposed exteriorly of the machine to facilitate adjustment without shutting down the machine and without tools.

11. In a mobile harvesting machine adapted for forward travel for treating forage or grain crop material, the combination including:

(a) a frame including widely spaced, generally vertical side supports, and crop treating rotary elements journalled therebetween to receive and traject treated crop material rearwardly thereof;

(b) crop deflector baffle means encompassing laterally spaced side areas and at least a portion of the top area disposed behind and above, respectively, of the rotary elements.

that improvements wherein the crop deflector means comprises:

(c) a pair of laterally spaced, rearwardly converging side deflector baffles adjoining the side supports;

(d) an upper, transversely extended, planar baffle adjustable between a raised generally horizontal positional position and a lowered generally vertical position and disposed adjacently above a forward portion of the side baffles;

(e) means pivotally supporting said upper baffle on said frame on the discharge side above and behind the crop treating elements; and (f) coacting means disposed respectively on and above said upper baffle supporting means and on said baffle for selectively and releasably adjusting and locking said pivotal baffle between a predetermined raised consolidated-windrow-producing position and a predetermined lowered wide-swath-producing position, said adjustment means being readily accessible exteriorly above said machine and selectively operable by hand without shutting down the machine and without any special tools.

References Cited

UNITED STATES PATENTS

| 2,854,046 | 9/1958 | Devorak | 56—192 X |
| 2,915,869 | 12/1959 | Coultas. | |
| 2,999,346 | 9/1961 | Mathews. | |
| 3,092,946 | 6/1963 | Mathews | 56—192 X |
| 3,106,052 | 10/1963 | Ingram. | |
| 3,149,449 | 9/1964 | Mulder | 56—192 |
| 3,383,844 | 5/1968 | Glass et al. | |

FOREIGN PATENTS

| 231,779 | 12/1960 | Australia. |
| 1,121,813 | 7/1968 | Great Britain. |

LOUIS G. MANCENE, Primary Examiner

J. N. ESKOVITZ, Assistant Examiner

U.S. Cl. X.R.

56—189